Aug. 2, 1955  J. L. HUNTER ET AL  2,714,413
METHOD AND APPARATUS FOR MAKING PLASTIC VENETIAN BLIND LADDERS
Filed Feb. 15, 1951  5 Sheets-Sheet 1
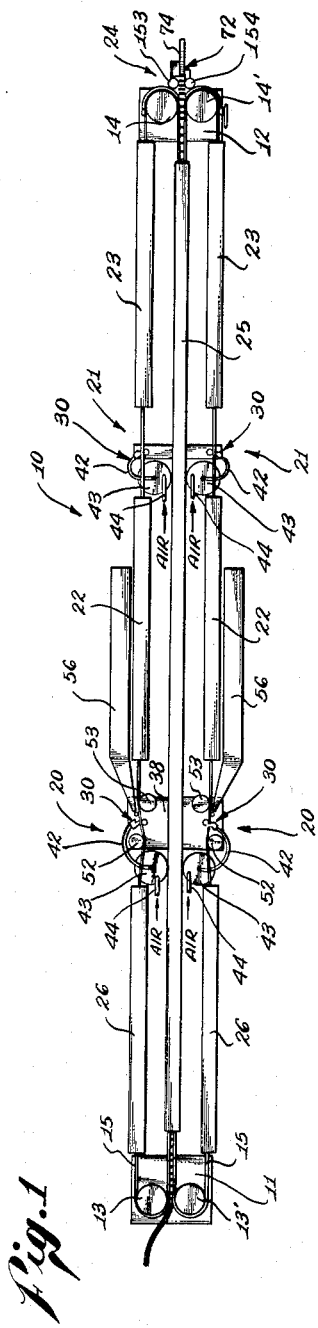
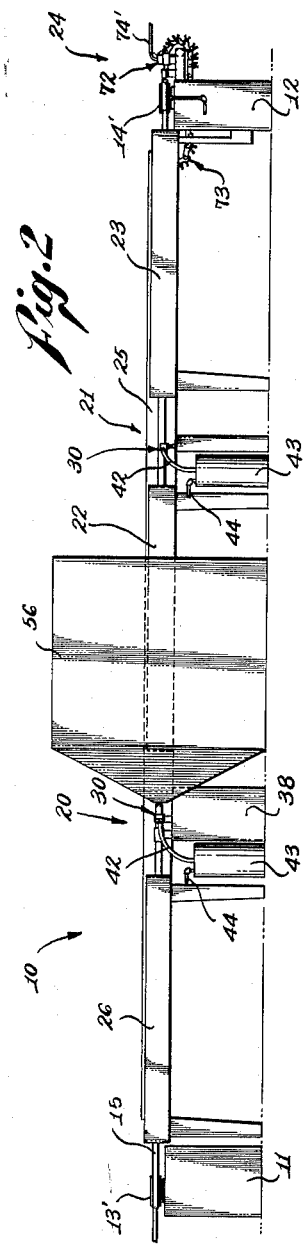
INVENTORS
JOSEPH L. HUNTER
THOMAS A. MARTIN
BY
Herbert E. Kidder
AGENT Aug. 2, 1955
J. L. HUNTER ET AL
2,714,413
METHOD AND APPARATUS FOR MAKING PLASTIC VENETIAN BLIND LADDERS
Filed Feb. 15, 1951
5 Sheets-Sheet 2
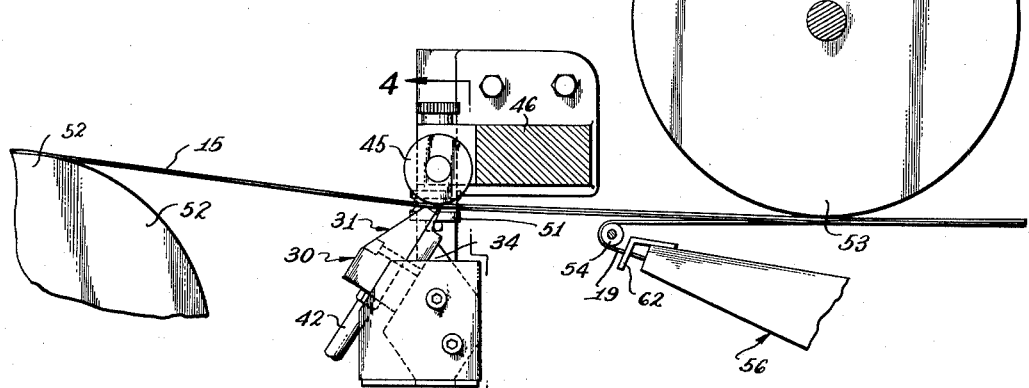
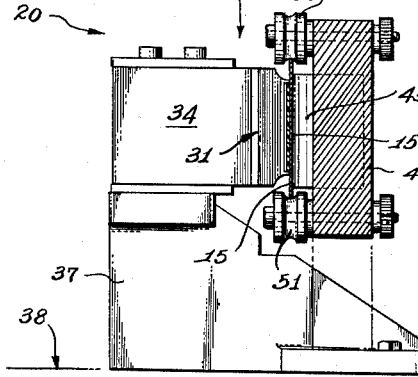
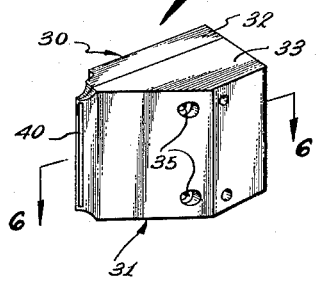
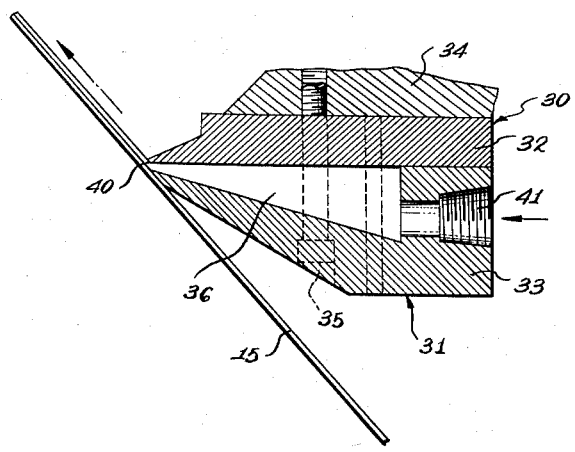
INVENTORS
JOSEPH L. HUNTER
THOMAS A. MARTIN
BY
Herbert E. Kidder
AGENT Aug. 2, 1955   J. L. HUNTER ET AL   2,714,413
METHOD AND APPARATUS FOR MAKING PLASTIC VENETIAN BLIND LADDERS
Filed Feb. 15, 1951   5 Sheets-Sheet 3
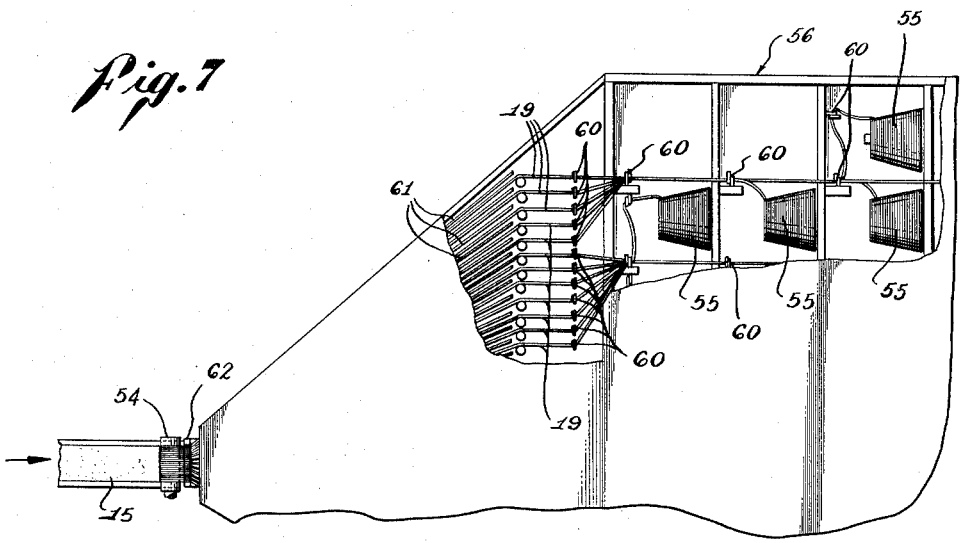
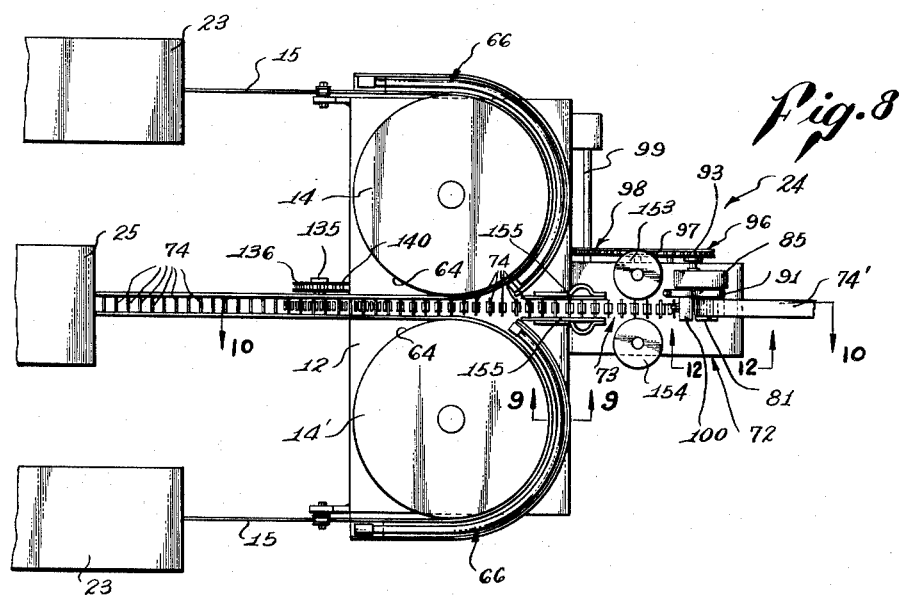
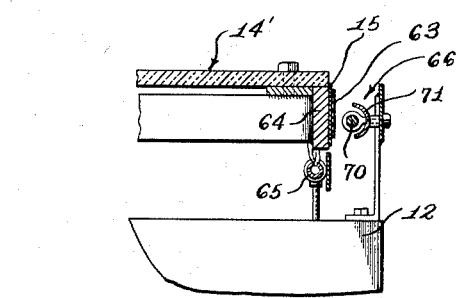
INVENTORS
JOSEPH L. HUNTER
THOMAS A. MARTIN
BY
Herbert E. Kidder
AGENT

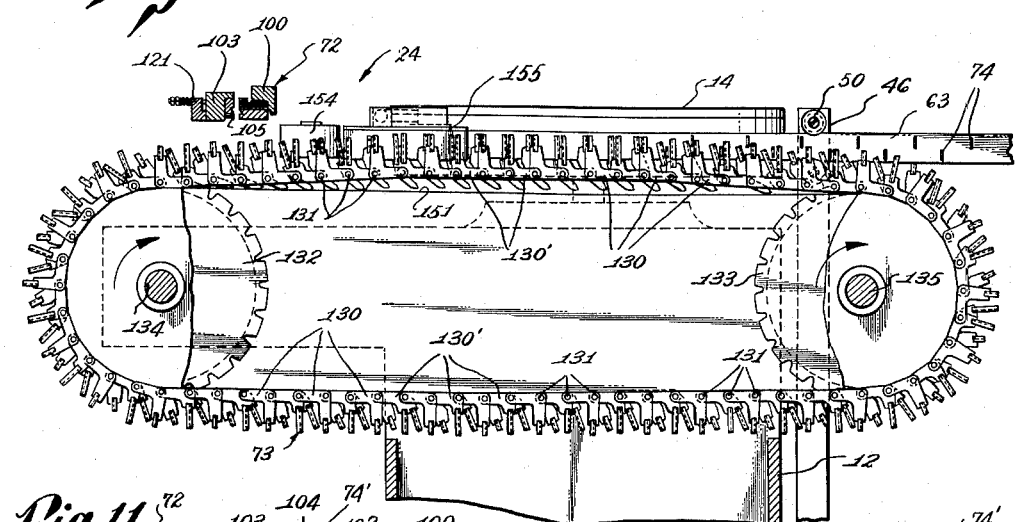

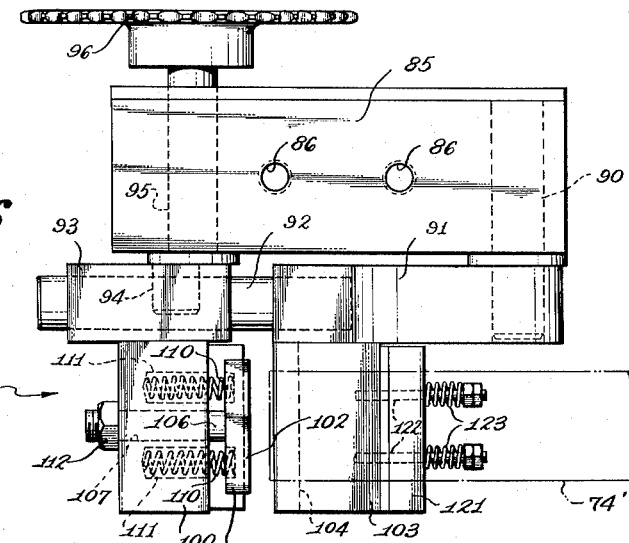
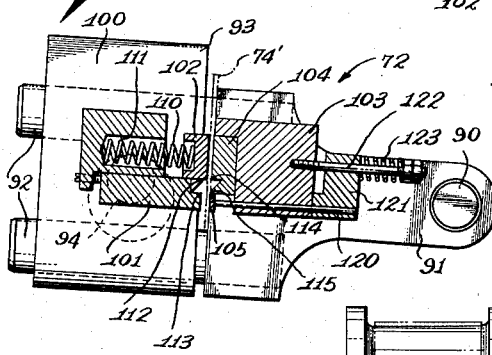
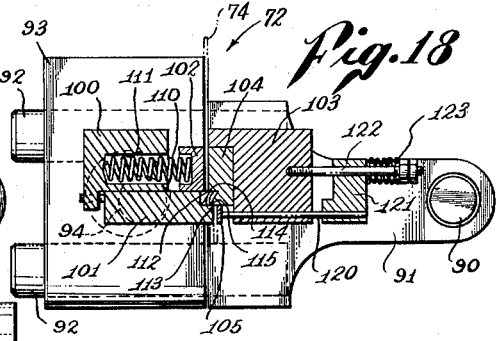
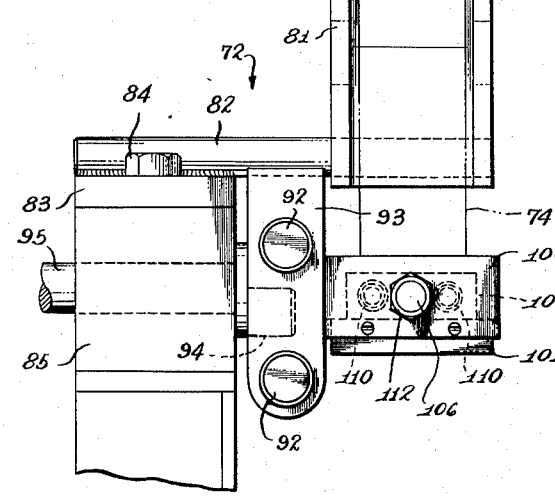

United States Patent Office 2,714,413
Patented Aug. 2, 1955

2,714,413

METHOD AND APPARATUS FOR MAKING PLASTIC VENETIAN BLIND LADDERS

Joseph L. Hunter and Thomas A. Martin, Riverside, Calif., assignors to Hunter Douglas Corporation, Riverside, Calif., a corporation of Delaware Application February 15, 1951, Serial No. 211,096

6 Claims. (Cl. 154—1.6)

The present invention relates to the manufacture of plastic Venetian blind ladders which are employed to support the slats in proper spaced relation to one another, and the primary object of the invention is to provide a new and improved method and apparatus for making such ladders.

Plastic ladders are a relatively recent development in the Venetian blind art; the first successful plastic ladder being disclosed in United States Patent 2,405,579, which issued to J. L. Hunter on August 13, 1946. In this patent, the plastic ladder is comprised of thin vertical tapes of plasticized polyvinyl chloride or vinyl copolymer, within which is embedded a plurality of longitudinally extending, substantially inelastic filaments or threads to prevent the plastic tapes from stretching under load. The cross bars are made of strips of the same material which are cemented at their ends to the tapes. In our co-pending application, Ser. No. 68,866, filed January 3, 1949, now Patent No. 2,588,550, entitled Venetian Blind Ladder, we show a later development of the plastic ladder, in which the cross bars are severed from a strip of extruded cross bar stock, and the ends of the cross bars are cemented to the tapes.

With the development of the plastic tape, it became necessary to develop a suitable method and apparatus for producing the same. The open, lattice-like shape of the Venetian blind ladder with its laterally spaced vertical tapes connected by a plurality of narrow cross bars staggered on opposite sides of the centerlines of the tapes, does not lend itself readily to conventional plastic fabrication methods, and prior attempts to make the tapes by extrusion or calendering process, or to join the cross bars to the tapes by stitching or cementing, proved unsatisfactory. Another object of the invention, therefore, is to provide a fully automatic machine for making the plastic tapes with longitudinally extending reinforcing threads embedded therein.

In the present invention, the tapes are made of a plasticized resin paste, sometimes referred to as plastisol, comprising extremely fine particles of unplasticized polyvinyl chloride or vinyl copolymer suspended in a liquid plasticizer, such as dioctyl phthalate or dinonyl phthalate. This resin paste is spread in a thin layer on a traveling endless band of stainless steel or the like, and a plurality of longitudinally extending, substantially inelastic filaments or threads is laid on the layer of paste. The paste layer is then heated up to the fusion temperature, so that the particles of resin combine with the plasticizer and fuse together. A second layer of resin paste is then spread on top of the first layer, and is heated to the fusion temperature, so that its particles of resin combine with the plasticizer and fuse together. Next, two of the tapes are brought together in spaced parallel relation and are transported in the same direction and at the same rate of speed, while ladder cross bars are inserted between them. Immediately ahead of this point, the tapes are heated above the fusion temperature of the plastic, so that their adjacent surfaces are in a tacky, partially fused condition to receive the ends of the plastic cross bars. The individual cross bars are severed from a strip of extruded plastic cross bar stock, and drop into a conveyer chain that carries them into the space between the tapes, with the ends of the cross bars pressed against the tacky adjacent surfaces of the tapes until the latter has cooled below the fusion temperature. The finished ladder is then stripped from the supporting bands.

The foregoing and other objects and advantages of the present invention will become apparent to those skilled in the art upon consideration of the following detailed description of the preferred embodiment thereof, reference being had to the accompanying drawings, wherein:

Figure 1 is a top plan view of the apparatus of our invention for making plastic Venetian blind ladder;

Figure 2 is a side elevation of the same;

Figure 3 is an enlarged, partially cut-away plan view of one of the applicators for spreading resin paste on the supporting band;

Figure 4 is a transverse vertical section through the same, taken along the line 4—4 in Figure 3;

Figure 5 is a perspective view of one of the resin paste applicator heads;

Figure 6 is a horizontal section through the same, taken along the line 6—6 in Figure 5;

Figure 7 is a partially cut-away elevational view of the apparatus for laying a plurality of longitudinally extending threads on the surface of the resin paste;

Figure 8 is a plan view of the machine at the end where the supporting bands come together in parallel, spaced relation, and the cross bars are severed from a strip of plastic cross bar stock and are inserted into the space between the tapes;

Figure 9 is an enlarged vertical section, taken at 9—9 in Figure 8, showing the means for heating the plastic tape so that its exposed outer surface is heated above the fusion temperature of the plastic;

Figure 10 is an enlarged vertical section, taken at 10—10 in Figure 8, showing the conveyor chain that carries the cross bars into the space between the tapes;

Figure 11 is an enlarged fragmentary sectional view through the mechanism for severing the cross bar strip into individual cross bars, and dropping the latter into the conveyor chain mechanism;

Figure 12 is an enlarged fragmentary side elevational view of the cross bar severing mechanism, as seen at 12—12 in Figure 8;

Figure 13 is a view showing a short section of the finished ladder produced by the method and apparatus of our invention;

Figure 14 is a perspective view of one of the cross bars in the ladder;

Figure 15 is an enlarged sectional view through one of the ladder tapes, taken at 15—15 in Figure 13;

Figure 16 is a top plan view of the cross bar severing mechanism;

Figure 17 is an enlarged fragmentary sectional view through the cross bar severing mechanism, showing the mechanism in one stage of its operation;

Figure 18 is a similar view of the same, showing the mechanism in the operation of severing a cross bar from the strip of stock; and Figure 19 is an end view of the severing mechanism shown in Figure 16.

In the drawings, the machine is designated in its entirety by the reference numeral 10, and includes base members 11 and 12 at opposite ends thereof, which support pairs of laterally spaced wheels 13, 13′ and 14, 14′. Trained around the two wheels 13, 14 and around the two wheels 13′, 14′ are two endless bands 15 of stainless steel or the like, upon which the plastic tapes are formed.

The bands 15 may be embossed on their outwardly facing surfaces, if desired, to produce a surface design in the plastic tapes. Down the center of the machine, the two bands 15 are arranged face-to-face in laterally spaced, parallel relationship, and the two wheels 14, 14' are driven by a suitable motor (not shown) so that the adjacent portions of the bands travel in the same direction and at the same rate of speed.

Disposed along the outer courses of the two bands 15 are stations 20 and 21, where thin layers of plastisol are spread on the band to form the plastic tapes. The plastisol used is preferably polyvinyl chloride in the form of extremely fine particles of unplasticized resin suspended in a liquid plasticizer such as dioctyl phthalate or dinonyl phthalate; although other resins such as vinyl copolymer, may be used in place of polyvinyl chloride. Among the suitable vinyl copolymers are vinyl chloride-acetate and vinyl chloride-vinylidene chloride. A plurality of reinforcing threads or filaments 19 (Figures 3, 7 and 15) is laid on the surface of the first layer of resin paste at each of the stations 20, and the band 15 with its layer of paste and threads is then carried through a tunnel oven 22, where the paste is heated to the temperature at which the particles of resin combine with the liquid plasticizer and fuse together into a homogeneous mass. The second layer of resin paste applied at station 21 is spread on top of the first layer and covers the reinforcing threads, so that the same are embedded centrally within the built-up strip. The bands 15 then travel through a second tunnel oven 23, where the second layer of resin paste is heated to the temperature at which the particles of resin combine with the liquid plasticizer and fuse together.

A third station 24 is provided at the right hand end of the machine, as seen in Figures 1 and 2, where plastic cross bars are severed from a continuous strip of extruded cross bar stock and inserted into the space between the tapes at the start of the return course. The plastic tapes are also heated above the fusion temperature as the bands pass around the wheels 14, 14', causing the outer surfaces of the tapes to become tacky and partially fused; and the ends of the cross bars are pressed against these tacky surfaces and become welded thereto as the plastic cools. On the return trip down the center of the machine, the bands 15 with the now-finished ladder supported thereon travel through a cooling tunnel 25 having forced circulation of cooling air, and at the left hand end of the machine, the ladder is stripped from the two bands 15 as the latter separate and travel outwardly around the wheels 13, 13'. As the bands start back along their outer course, they enter tunnel ovens 26, where they are preheated prior to receiving the first layer of resin paste at station 20.

The resin paste is spread on the preheated bands 15 by means of applicators 30, best shown in Figures 3 to 6, each of which comprises a generally wedge-shaped head 31 which, for ease of manufacture, is made of two parts 32 and 33 that are clamped together and secured to a supporting block 34 by screws 35. Block 34 is mounted on a bracket 37, and the latter is supported on a stand 38. Part 33 is milled out to provide a cavity 36 within the head 31, which opens through a narrow slot 40 in the pointed end thereof. A tapped hole 41 opens into the cavity 36 at the end opposite the slot 40, and a supply pipe 42 (Figure 3) is threaded into the hole. Each of the pipes 42 is connected to a drum 43 containing resin paste, and a high-pressure air line 44 is connected to each of the drums to force the resin paste out through the pipe 42 to the applicator 30.

The band 15 is backed up on the side opposite the applicator 30 by a roller 45 which is journaled on a supporting member 46; the latter being rigidly attached to the mounting bracket 37. Also journaled on the supporting member 46 are two vertically spaced, circumferentially grooved rollers 50 and 51 which engage the edges of the band 15 to guide the same.

At station 20, the band 15 is bent around two rollers 52 and 53 on opposite sides of the band, as shown in Figure 3. The rollers 52, 53 are rotatably supported on the stand 38 and are spaced apart laterally so that a line tangent to both of them is inclined at a slight angle to the normal line of the band 15. The applicator 30 applies the resin paste to the band 15 at a point approximately midway between the rollers 52, 53, and immediately beyond this point, the reinforcing threads 19 are laid on the surface of the thin layer of resin paste. The reason for carrying the band 15 around the two rollers 52, 53 as just described, is to provide a bend in the band, whereby the threads 19 can be pulled in a straight line from a roller 54 onto the surface of the resin paste layer. The roller 54 is positioned so that the portion of its periphery from which the threads 19 depart is in the same vertical plane as the surface of the band 15 beyond the roller 53, and the threads therefore approach the resin paste layer in the same plane as that occupied after they have become adhered to the paste. This eliminates any tendency on the part of the threads to pull away from the surface of the resin paste layer, and permits the threads to be held under a slight amount of tension so as to remove any slack therefrom.

The reinforcing threads 19 are unwound from a plurality of cones 55 (Figure 7) supported within a housing 56, and are then led through individual eyelet guides 60, converging dividers 61, and comb 62 (Figure 3) to the roller 54. The threads pass around the roller 54 on the outer surface thereof and then converge with the band 15, coming into contact with the surface of the resin paste layer directly opposite the point of contact of the roller 53 with the band.

The band 15 with its applied layer of resin paste and adhering threads then enters the tunnel oven 22, where the temperature of the resin paste is raised to the point at which the particles of resin combine with the liquid plasticizer and coalesce into a homogeneous mass. The temperature of the oven 22 is dependent upon the length of time that the resin paste is confined therein, and is inversely proportional to the speed of travel of the bands 15 and to the length of the ovens. However, it has been our experience that good results are obtained with a temperature of about 280° to 300° F.

Upon leaving the oven 22 at the exist end thereof, the band 15 travels past station 21, where a second thin layer of resin paste is spread on top of the first layer by another applicator 30. The band then enters the next tunnel oven 23, where the temperature of the resin paste is raised to the point at which the resin particles of the second layer of paste combine with the liquid plasticizer and fuse together into a homogeneous mass with the first layer of resin. Experience indicates that best results are obtained with an oven temperature from 330° to 340° F.

The bands 15, with the now-finished plastic tapes 63 supported thereon, leave the ovens 23 at the right hand end thereof and ride around on the outer rim 64 of the wheels 14, 14', to approach station 24. The wheel rim 64 is heated by flames from a gas ring 65 (Figure 9) disposed below the wheel, and the outer surface of the plastic tape is additionally heated by a radiant heater 66 comprising a substantially semi-circular resistance element 70 spaced radially outward from the peripheral surface of the wheel rim, and backed up by a trough-shaped reflector 71. The flames from the gas ring 65 and the radiant heat from the heater 66 raise the temperature of the plastic tape 63 to the point at which the outer surface of the tape becomes partially fused, or tacky, in readiness to receive the plastic cross bars from the feeding and severing mechanism 72 and conveyor chain 73.

The plastic cross bars are designated by the reference numeral 74, and are severed from a continuous strip 74' of plastic cross bar stock of the cross section shown by the exposed top edge of the cross bar in Figure 14. The strip 74' is preferably of extruded plasticized polyvinyl chloride, approximately 2⅛" wide and .020" thick, except for a narrow width along both edges where the thickness is reduced to approximately .010" to provide flexible hinge portions 75. At the extreme edges of the strip are oppositely directed flanges 76, which provide a broad, flat base 80 of substantial area that is subsequently fused to the tapes.

The strip 74' is led down into the feeding and severing mechanism 72 over a curved guide member 81 mounted on the end of a rod 82. The rod 82 is welded to the top of a plate 83, and the latter is secured by bolts 84 to a supporting block 85; the bolts 84 being screwed into tapped holes 86 (Figure 16) in the block.

Swingably mounted on the projecting end of the shaft 90 is an arm 91 having two vertically spaced, parallel guide rods 92 projecting from the free end thereof. A head 93 slides on the guide rods 92 and is engaged by a crank pin 94 on the end of a drive shaft 95. Drive shaft 95 is rotatably supported within the block 85 parallel to the shaft 90, and projects from the opposite side of the block 85. A sprocket wheel 96 is mounted on the projecting end of the shaft 95, and is driven by a chain 97 (Figure 8), sprocket 98, and shaft 99 from a motor (not shown) enclosed within the base member 12.

Rigidly fixed to the side of the head 93 in vertical alignment with guide member 81 is a block 100, which carries a knife 101 and pressure pad 102. Another block 103 is attached to the arm 91 directly opposite block 100, and mounted thereon is a knife 104 and stripper plate 105. The pressure pad 102 is mounted on a rod 106, which is slidably disposed within a hole 107 in block 100; and yieldingly urging the pressure pad to the right, as viewed in Figures 16, 17 and 18 are two springs 110 that are seated within cavities 111 in the block. A limit stop nut 112 is screw-threaded on the left-hand end of the rod 106 to limit movement of the pressure pad to the right and to position the face of the pressure pad slightly beyond the cutting edges of the knife 101.

The knife 101 has two sets of cutting edges 112 and 113, which cooperate with cutting edges 114 and 115, respectively, of knife 104. Cutting edges 113 and 115 are somewhat longer than the width of the plastic strip 74', and act to sever the cross bars 74 each time that the edges come together. The cutting edge 112, however, is cut off at its ends so that the length thereof is slightly less than the width of the strip 74'; the function of the edges 112, 114 being to cut a slit 116 (Figure 14) in the cross bar through which the Venetian blind slat can be inserted, if desired, so that one portion of the cross bar passes above and the other below the slat to hold the same against fluttering.

The stripper plate 105 is mounted on the ends of two rods 120 which slide through holes in block 103, and have a part 121 fixed to the projecting rear ends thereof. Part 121 is slidably mounted on a pair of laterally spaced guide rods 122 projecting from the back side of block 103, and springs 123 encircling rods 122 urge the piece 121 to the left.

As the drive shaft 95 rotates in a clockwise (Figures 17 and 18) direction, the head 93 is carried around a circular orbit by the crank pin 94, and in the traveling of this circular path, is shifted back and forth along the guide rods 92. The circular movement of the head 93 causes the arm 91 to oscillate on the shaft 90, and during each cycle, the pressure pad 102 engages the strip 74' near the top of its movement and pulls the strip down with it while the cutting edges 112, 114 pierce the slit 116, and cutting edges 113, 114 sever the previously-slit end of the strip. During the course of the downward travel of the mechanism, as just described, the pressure pad 102 yields to the left against the pressure of springs 110, and the stripper plate 105 yields to the right against the pressure of springs 123. As the mechanism approaches the bottom of its travel, the head 93 moves to the left with respect to the arm 91, and the knife 101 is withdrawn from knife 104, allowing the pressure pad 102 and stripper plate 104 to be restored to their original positions by their respective springs. Figure 17 shows the mechanism at the instant the strip 74' is engaged by the pressure pad 102 at the top of the stroke, while Figure 18 shows the knife blades piercing and severing the strip near the bottom portion of the stroke.

The severed cross bars 74 drop from the mechanism 72 into the open jaws of the conveyor chain 73, and are carried thereby into the space between the two plastic tapes 63. The conveyor chain 73 comprises a plurality of links 130 connected together by pivot pins 131, and the chain is passed around two sprocket wheels 132 and 133 mounted on shafts 134 and 135, respectively. The two shafts 134, 135 are journaled on the base member 12, and fixed to shaft 135 is a sprocket wheel 136 (Figure 8) that is driven in a clockwise direction, as viewed in Figure 10, by a chain 140 from the motor driving the endless bands 15 and mechanism 72.

The chain 73 is constructed so that each of the links 130 is provided with means to receive one of the cross bars dropping from the mechanism 72; and the cross bars are carried thereby into the space between the two tapes 63, with their end portions 80 pressed against the tacky, partially fused surfaces of the tapes. The cross bars are carried at two different elevations on the conveyor chain, alternating high and low, so that in the finished ladder the cross bars are staggered on opposite sides of the centerline of the tapes and are spaced apart laterally a distance sufficient to allow the Venetian blind lift cord to be threaded therebetween. To this end, every other link 130 of the conveyor chain 73 is provided with a long arm portion 141 (Figure 11) projecting upwardly for an appreciable distance and terminating in a flat shelf surface 142. The in-between links 130' are provided with short arm portions 141' terminating in flat shelf surfaces 142'. Fixed to the outer ends of the arms 141 and projecting upwardly therefrom in the transverse vertical plane are flat plates 143; similar plates 143' being fixed to the ends of arms 141'.

Pivoted on each of the pins 131 between the side links 130 is a bell crank 144, each of which has a downwardly and forwardly inclined leg 145 and an upwardly projecting leg 146 or 146'. The bell cranks associated with the chain links having the long arm portions 141 are provided with long legs 146; while those associated with the links having short arm portions 141' are provided with short legs 146'. Flat plates 150 and 150' are fixed to the bell crank legs 146 and 146', respectively, and cooperate with the plates 143 and 143' to clamp the cross bars 74 therebetween. Connected to the backside of each of the bell cranks 144 is a spring 149, the other end of which is attached to the top edge of the trailing plate 143 or 143'. The spring 149 exerts a clockwise (Figure 11) torque on the bell crank, tending to close the plate 150 or 150' against its associated plate 143 or 143'.

The outer end of the downwardly and forwardly inclined leg 145 rides on a flat, horizontal track 151 extending between the sprocket wheels 132, 133, and the angular position of the bell crank 144 about the pin 131 is determined by the level of the track 151 with respect to the center of the pin 131. The side links 130 ride on two laterally spaced side rails 152, one of which can be seen in Figure 11. The rails 152 rise gradually from the left-hand sprocket wheel 132, as seen in Figure 10, to a flat portion midway between the sprockets, and then descend gradually as they approach the right-hand sprocket wheel 133. This causes the conveyor chain to raise up slowly until the cross bars 74 are properly registered with the tapes 63; then travel parallel with the tapes while the ends of the cross bars are adhered thereto; and finally to descend slowly from between the tapes until the plates 143, 143' and 150, 150' clear the cross bars of the ladder as the conveyor chain passes down over sprocket wheel 133.

As the chain links 130 ascend the slope at the left-hand end of the rails 152 (Figure 10), the leg 145 drops downwardly with respect to the pivot pin 131, allowing the spring 149 to rock the bell crank 144 in a clockwise direction and bring the plate 150, 150' against its respective stationary plate 143, 143'. However, before starting up the incline and while the plates 150, 143 and 150', 143' are still spread wide apart, the cross bars 74 severed by the mechanism 72 dropped down between them onto the shelves 142 and 142', and are carried along thereon.

As the plates 150, 143 and 150', 143' start to come together, the conveyor chain passes between two laterally spaced rollers 153 and 154, which engage the ends of the cross bars to align them properly. The rollers 153, 154 are driven so that their adjacent peripheral surfaces are travelling in the same direction and at the same speed as the conveyor chain, and the ends of the cross bars are therefore engaged with a minimum of disturbance.

After the plates 150, 143 and 150', 143' have clamped firmly onto the cross bar 74, the latter is carried between two hot plates 155 of the electrical resistance type, which heat up the base surfaces 80 of the cross bars to prepare the same for fusion with the tapes. The cross bars are carried into the space between the tapes, and the ends thereof are pressed into contact with the tacky, partially fused surfaces of the tapes. The conveyor chain 73 and endless bands 15 then travel together for a short distance in parallel relationship and at the same speed, so that the cross bars are maintained in a fixed position relative to the tapes until the plastic has cooled down below the fusion temperature. At this point, the chain links 130 descend the slope at the right-hand end of the rails 153 (Figure 10), causing the leg 145 to rise with respect to the pivot pin 131, thereby rocking the bell crank 144 in the counter-clockwise direction and opening the plate 150, 150' from its respective stationary plate 143, 143'.

As the conveyor chain 73 passes down over the sprocket 133, the finished ladder, with cross bars 74 permanently fused to the side tapes 63, enters the long cooling tunnel 25 extending back through the center of the machine to the opposite end thereof. By the time the ladder emerges from the exit end thereof, the plastic material has been cooled down to room temperature and can readily be stripped from the endless bands as the latter pass around sprockets 13, 13'.

While we have shown and described in considerable detail what we believe to be the preferred form of our invention, it will be understood that various changes may be made in the shape and arrangement of the several parts, as well as in other details, without departing from the broad scope of the invention, as defined in the following claims.

We claim:

1. The method of making plastic Venetian blind ladders comprising the steps of bringing two plastic tapes together in spaced parallel relation and transporting said tapes in the same direction and at the same rate of speed, applying heat to said tapes immediately ahead of the point at which they become parallel so that the adjacent surfaces thereof are heated above the fusion temperature of the plastic, severing a strip of plastic cross bar stock into individual cross bars, and carrying said individual cross bars into the space between said parallel portion of said tapes at the same rate of speed and in the same direction of travel as the tapes, pressing the ends of said cross bars into contact with the tacky, partially fused adjacent surfaces of the tapes and holding said ends in place until the plastic has cooled below the fusion temperature.

2. A machine for making plastic Venetian blind ladders comprising a pair of endless traveling bands having adjacent cooperating portions arranged face-to-face in laterally spaced, parallel relationship, said bands being driven so that said cooperating portions travel in the same direction and at the same rate of speed, means for forming plastic tapes on the outer faces of the outer courses of said bands in adhesive contact therewith, whereby said tapes are carried by said bands and continue to be supported by them as they turn and form the inner course, a heater for applying heat to said tapes so that the exposed surfaces thereof are heated above the fusion temperature of the plastic, and a conveyor carrying plastic cross bars into the space between said bands at the point where the bands approach one another for the beginning of parallel travel, said conveyor including means for bringing the ends of said cross bars into contact with the tacky, partially fused adjacent surfaces of said tapes as the latter are carried along by said bands and maintaining said contact until said tapes have cooled below the fusion temperature.

3. A machine for making plastic Venetian blind ladders comprising a pair of traveling supports for bringing a pair of plastic tapes together in face-to-face, laterally spaced, parallel relationship, means for driving said traveling supports in the same direction and at the same rate of speed, a heater for heating said tapes so that the exposed surfaces thereof are heated above the fusion temperature of the plastic, and a conveyor for carrying plastic cross bars into the space between said tapes at the point where the tapes come together for the beginning of parallel travel, said plastic cross bars being carried along with said tapes with the ends thereof pressed against the tacky, partially fused adjacent surfaces of the tapes until the latter have cooled below the fusion temperature.

4. A machine for making plastic Venetian blind ladders comprising a pair of travelling supports for bringing a pair of plastic tapes together in face-to-face, laterally spaced, parallel relationship, means for driving said traveling supports in the same direction and at the same rate of speed, a heater for heating said tapes so that the exposed surfaces thereof are heated above the fusion temperature of the plastic, a feeding and severing mechanism for feeding a strip of plastic cross bar stock up to a point adjacent the beginning of parallel travel of the tapes and severing said strip into individual cross bars, and a conveyor disposed to receive said cross bars from said feeding and severing mechanism and operable to carry the cross bars into the space between said tapes, said cross bars being carried along with said tapes at the same speed as the latter and with their ends pressed against the tacky, partially fused adjacent surfaces of the tapes until the latter have cooled below the fusion temperature.

5. A machine for making plastic Venetian blind ladders comprising a pair of traveling supports for bringing a pair of plastic tapes together in face-to-face, laterally spaced, parallel relationship, means for driving said traveling supports in the same direction and at the same rate of speed, a heater for heating said tapes so that the exposed surfaces thereof are heated above the fusion temperature of the plastic, a feeding and severing mechanism for feeding a strip of plastic cross bar stock up to a point adjacent the beginning of parallel travel of the tapes and severing said strip into individual cross bars of slightly less than one-half the width of said tapes, and a conveyer disposed to receive said cross bars from said feeding and severing mechanism and operable to carry the cross bars into the space between said tapes, said conveyer being constructed and arranged so that said cross bars are staggered alternately on opposite sides of the longitudinal center lines of said tapes and are carried along with said tapes at the same speed as the latter, the ends of said cross bars being pressed against the tacky, partially fused adjacent surfaces of the tapes until the latter have cooled below the fusion temperature.

6. A machine for making plastic Venetian blind ladders comprising a pair of endless traveling bands having adjacent cooperating portions arranged face-to-face in laterally spaced, parallel relationship, said bands being driven so that said cooperating portions travel in the same direction and at the same rate of speed, applicators for spreading a thin layer of resin plastisol on the outer course of each of said bands, said plastisol consisting of finely divided particles of unplasticized resin suspended in liquid plasticizer, means for laying a plurality of longitudinally extending parallel filaments on the surface of said layer of plastisol, an oven for applying heat to said layer of plastisol so as to cause the particles of resin therein to combine with the plasticizer and fuse together, other applicators for spreading a second thin layer of resin plastisol on top of each of said first-named layers, a second oven for applying heat to said second layer of plastisol so as to cause the particles of resin therein to combine with the plasticizer and fuse together, thereby completing two tapes for the ladder, a heater for applying heat to said tapes so that the exposed surfaces thereof are heated above the fusion temperature of the plastic, a feeding and severing mechanism for feeding a strip of plastic cross bar stock up to a point adjacent the beginning of said parallel portion of the tapes and severing said strip into individual cross bars of slightly less than one-half the width of said tapes, and a conveyer disposed to receive said cross bars from said severing means and operable to carry the cross bars into the space between said tapes, said conveyer being constructed and arranged so that said cross bars are staggered alternately on opposite sides of the longitudinal center lines of said tapes and are carried along with said tapes at the same speed as the latter, the ends of said cross bars being pressed against the tacky, partially fused adjacent surfaces of the tapes until the latter have cooled below the fusion temperature.

References Cited in the file of this patent

UNITED STATES PATENTS

| | | |
|---|---|---|
| 25,107 | Forot | Aug. 16, 1859 |
| 493,220 | Palmer | Mar. 7, 1893 |
| 637,636 | Meyer | Nov. 21, 1899 |
| 1,327,826 | Jameson | Jan. 13, 1920 |
| 1,535,647 | Brennan | Apr. 28, 1925 |
| 1,544,217 | Castricum | June 30, 1925 |
| 1,742,777 | Midgley | Jan. 7, 1930 |
| 1,871,412 | Hopkinson | Aug. 9, 1932 |
| 1,992,665 | Hazell | Feb. 26, 1935 |
| 2,327,627 | Esselin | Aug. 24, 1943 |
| 2,445,290 | Gonda | July 13, 1948 |
| 2,527,627 | Frankel et al. | Oct. 31, 1950 |
| 2,535,926 | Hunter et al. | Dec. 26, 1950 |
| 2,591,923 | Delegard | Apr. 8, 1952 |
| 2,618,580 | Lancaster | Nov. 18, 1952 |
| 2,620,850 | Janowski | Dec. 9, 1952 |
| 2,631,957 | Francis, Jr. | Mar. 17, 1953 |